(12) United States Patent
Matsumiya et al.

(10) Patent No.: US 7,045,088 B2
(45) Date of Patent: May 16, 2006

(54) MEASURING TOOL, ENCODER AND PRODUCING METHOD OF ENCODER

(75) Inventors: Sadayuki Matsumiya, Kawasaki (JP); Susumu Yoshioka, Kawasaki (JP); Shuuji Hayashida, Kawasaki (JP); Kouji Sasaki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/985,925

(22) Filed: Nov. 12, 2004

(65) Prior Publication Data

US 2005/0081400 A1 Apr. 21, 2005

Related U.S. Application Data

(62) Division of application No. 10/440,101, filed on May 19, 2003, now Pat. No. 6,834,439.

(30) Foreign Application Priority Data

May 21, 2002 (JP) ............... 2002-146633
May 21, 2002 (JP) ............... 2002-146637

(51) Int. Cl.
*B29C 45/16* (2006.01)

(52) U.S. Cl. ............... 264/328.18; 264/131; 264/132; 33/674; 33/542.1; 33/558.01

(58) Field of Classification Search ............ 264/328.8, 264/129, 241, 257, 328.18, 131, 132; 156/247; 33/674, 542.1, 558.01
See application file for complete search history.

(56) References Cited

U.S. PATENT DOCUMENTS

| 5,016,359 | A | | 5/1991 | Nagaoka et al. |
| 5,325,583 | A | * | 7/1994 | Shimizu et al. ............... 29/849 |
| 5,406,715 | A | | 4/1995 | Koizumi et al. |
| 5,483,751 | A | | 1/1996 | Kodato |
| 5,711,084 | A | | 1/1998 | Spanner et al. |
| 5,842,283 | A | | 12/1998 | Yatsu et al. |
| 6,119,359 | A | | 9/2000 | Suzuki et al. |
| 6,154,976 | A | | 12/2000 | Yamashiro et al. |
| 6,568,093 | B1 | | 5/2003 | Kogiso et al. |
| 6,594,915 | B1 | | 7/2003 | Matsumiya et al. |
| 6,658,754 | B1 | | 12/2003 | Omi |
| 6,673,872 | B1 | * | 1/2004 | van Beek et al. ............ 525/397 |
| 6,699,586 | B1 | | 3/2004 | Edelmann et al. |
| 2003/0215167 | A1 | | 11/2003 | Kuwabara |

FOREIGN PATENT DOCUMENTS

| JP | A 09-309710 | 12/1997 |
| JP | A 10-020439 | 1/1998 |
| JP | A 11-214382 | 8/1999 |
| JP | A 11-263916 | 9/1999 |
| JP | A 2001-098160 | 4/2001 |
| JP | A 2002-076324 | 3/2002 |

* cited by examiner

*Primary Examiner*—Michael P. Colaianni
*Assistant Examiner*—Monica A. Huson
(74) *Attorney, Agent, or Firm*—Oliff & Berridge, PLC

(57) ABSTRACT

Components of a measuring tool such as a main beam (11) and a slider (12) of a caliper gauge (1) are formed by a synthetic resin containing carbon nanofiber and an electroconductive electrode (15) is formed on the surface of the main beam (11) at a predetermined pitch, so that a production process can be simplified, rigidity of the components can be enhanced, linear expansion coefficient can be reduced, and anti-frictional properties can be improved, thus enhancing durability while improving measurement accuracy.

3 Claims, 12 Drawing Sheets

MEASURING TOOL, ENCODER AND PRODUCING METHOD OF ENCODER

This is a Divisional of application Ser. No. 10/440,101, filed May 19, 2003, now U.S. Pat. No. 6,834,439. The entire disclosure of the prior application is hereby incorporated by reference herein in its entirety.

BACKGROUND OF THE INVENTION

1. Field of the Invention

The present invention relates to a measuring tool, an encoder used for the measuring tool and a producing method of the encoder.

2. Description of Related Art

Various measuring tools for measuring distance, length and angle have been conventionally known. For instance, a caliper gauge is used as a measuring tool for measuring length. A caliper gauge has a main beam having a first measuring jaw, and a slider capable of slide movement along the longitudinal direction of the main beam and having a second measuring jaw to be in contact with a workpiece together with the first measuring jaw.

Maintaining measurement accuracy for a long time is of great importance for such a caliper gauge, and the main beam and the slider may preferably be made of material capable of minute processing and enduring repeated slide movement. Accordingly, the main beam and the slider of a caliper gauge are made of anti-frictional thermally treated metal having low linear expansivity such as stainless.

However, great amount of time and cost are required for machining metal down into a desired shape. In order to obtain good slidability between the main beam and the slider, the slide surface of the main beam and the slider has to be accurately machined by lapping etc. Such machining is also required for accurate measuring tool other than a caliper gauge. Since such measuring tool experiences many accurate processing during production process, the production line becomes complicated and production cost can be increased.

In order to maintain the measurement accuracy, linear expansion has to be kept within a predetermined range. In a general measuring tool, the error caused by the linear expansion is restrained by maintaining the temperature during measurement at twenty degrees Celsius, for instance. However, the measurement error by the linear expansion inevitably occurs in a severe measuring environment under hot and low temperature.

Further, when the measuring tool is grasped by hand, different linear expansion occurs on account of different temperature distribution by hand, which results in measurement error.

Further, a measuring tool having a slide mechanism such as a caliper gauge is likely to be worn after repeated use. Lubricant has to be used for reducing friction to maintain smooth slide movement, which is likely to cause adhesion of dust etc.

Digital measuring tool such as digital caliper gauge and digital micrometer has an encoder for detecting the movement of the movable member relative to the fixed member between the slide surface of the main beam and the slider.

As shown in FIG. 13, the encoder has a main scale 15 having an electrode pattern in which an electro-conductive portion 141 and an insulative portion 142 are alternately arranged along the longitudinal direction of a main beam 11 at a predetermined pitch, and a detector head 125 provided on a slider 12 to be electrostatically coupled with the main scale 15 to detect relative movement of the slider relative to the main beam.

The main scale 15 has an insulator 161 such as glass and polycarbonate and the electro-conductive portion 141 provided on the surface of the insulator 161 at a predetermined pitch. The insulator 161 is fixed (i.e. adhered) on the main beam 11 through a bonding layer 162.

The detected value of the detector head 125 is outputted to an electric circuit 126 to be arithmetically processed and displayed on a non-illustrated display as a measurement value.

However, since the main scale 15 is bonded on the main beam 11, the main scale 15 may be curved or the main scale 15 may be peeled off from the main beam 11, which can result in error in the detected value.

Further, linear expansion of the main scale 15 and uneven heat distribution by the heat of hand also occur as in a normal measuring tool.

The above problem is not restricted to a digital caliper gauge but also occurs in a measuring tool having an encoder for detecting relative movement of a movable component relative to a fixed component such as a digital micrometer and a digital dial gauge.

SUMMARY OF THE INVENTION

A primary object of the present invention is to provide a measuring tool which has high performance and can be easily produced, thus overcoming the conventional problem.

In order to attain an object of the present invention, a measuring tool according to an aspect of the present invention has a component at least a part of which is formed by a synthetic resin containing a nanoscale compound.

The measuring tool refers to a tool for measuring physical quantity such as length, distance and angle, which may be a caliper gauge, micrometer, a dial gauge etc. The component refers to a member constructing the measuring tool such as a main beam of a caliper gauge, a frame and a spindle of a micrometer, and a case body, a gear and a spindle of a dial gauge etc.

Though synthetic resin in general is fragile and has great linear expansion coefficient, advantages such as enhancement in rigidity, restrained linear expansion, improvement in anti-frictional properties, decrease in friction coefficient, improvement in thermal conductivity, and application of electro-conductivity or insulative performance can be obtained by adding nanoscale compound (e.g. carbon nanofiber) into base material of synthetic resin (e.g. polystyrene) and defining various conditions. It is not precisely clear why such advantages can be obtained, but it is thought that such advantages are based on a network of the nanoscale compound within the synthetic resin.

Accordingly, since the linear expansion coefficient can be reduced in a measuring tool having a component made of synthetic resin containing nanoscale compound such as a caliper gauge having a main beam and a slider composed of synthetic resin containing nanoscale compound, error on account of linear expansion can be eliminated and an accurate measurement can be conducted. When the linear expansion coefficient is low, accurate measurement is possible without being influenced by measurement temperature under severe condition of high and low temperature.

Since the anti-frictional properties can be improved, no abrasion is caused on the measuring tool after repeated use, thereby maintaining measurement accuracy.

Since the friction coefficient is low, excellent slidability can be obtained and slide mechanism can be used without lubricant, thus preventing stain or dust on the measuring tool.

Since excellent thermal conductivity can be obtained, heat of hand instantaneously disperses even when the measuring tool is grasped for measurement, so that partial expansion difference can be eliminated. Accordingly, measurement error on account of hand heat can be eliminated for a hand-tool type measuring tool which is grasped in use, thus enabling accurate measurement.

Since the rigidity is enhanced, the deformation of the measurement tool can be restrained. Especially, the deformation caused by pressing force applied on a measuring tool which sandwiches a workpiece for measurement such as a caliper gauge and a micrometer can be restrained, thus enhancing measurement accuracy.

Since the rigidity is enhanced, the thickness and size of the component can be reduced while maintaining a predetermined strength.

Since the measuring tool is made of synthetic resin, the weight of the measuring tool can be reduced. Further, since synthetic resin is used, the measuring tool is more easily fitted to hand than metal without causing metal allergy.

The component at least a part of which is made of synthetic resin containing nanoscale compound may preferably be formed by injection-molding.

When the synthetic resin containing nanoscale compound is injection-molded, no machining is necessary and the measuring tool can be easily produced. Accordingly, production line and production process can be simplified and production cost can be lowered. Since the synthetic resin containing nanoscale compound has excellent moldability and pattern transferability, accurate components can be formed by injection-molding. No surface finishing is necessary after injection-molding because of excellent pattern transferability.

When the measuring tool has a slide mechanism including a base and a slide body slidable relative to the base, at least either the base or the slide body may preferably be formed by the synthetic resin containing a nanoscale compound.

In the above, both of the base and the slide body of the slide mechanism may be formed by the synthetic resin containing nanoscale compound or only either the base or the slide body may be formed by the synthetic resin containing nanoscale compound. Since such synthetic resin containing nanoscale compound has excellent anti-frictional properties, the slide mechanism does not worn out after repeated use and, because of low friction coefficient, superior slidability can be given to a slide mechanism even without lubricant.

The measuring tool of the above aspect of the present invention may preferably include a base; a slide body slidable relative to the base; and a slide guide provided on one of the opposing sides of the base and the slide body to guide the slide body while being in contact with the other of the opposing sides, in which the slide guide may preferably be formed by the synthetic resin containing a nanoscale compound.

Since the slide guide abutting to the slide mechanism is formed by synthetic resin containing nanoscale compound, the slidability and anti-frictional properties of the slide mechanism can be improved.

When nanoscale compound is used as an agent for applying electro-conductivity, electro-conductivity can be applied to the slide guide, thereby preventing static electricity from being generated on the slide surface. Accordingly, even when a linear encoder is provided on the slide mechanism, damage or malfunction caused by static electricity can be prevented, thereby securing accurate measurement.

When the measuring tool has an electric circuit, a casing including an electric circuit therein may preferably be provided, the casing being formed by the synthetic resin containing a nanoscale compound.

Nanoscale compound can work both as an electro-conductivity-applying agent and as insulation-applying agent. Accordingly, with the use of the function of the nanoscale compound as an electro-conductivity applying agent, the electric circuit is accommodated in a casing formed by synthetic resin containing nanoscale compound. Then, the casing itself works as an electromagnetic shield. As a result, the electric circuit of the measuring tool such as a digital caliper gauge and a digital micrometer can be protected from external magnetic field and external electric field. Since the casing works as an electromagnetic shield, no separate electromagnetic shield is necessary, thus reducing size and production cost of the measuring tool.

When the measuring tool has a power transmitting member for transmitting a power, the power transmitting member may preferably be formed by the synthetic resin containing a nanoscale compound.

Since the power transmitting member such as a rack and gear train is formed by synthetic resin containing nanoscale compound, rigidity and anti-frictional properties can be improved, thereby providing a power transmitting member capable of enduring repeated use. Since the rigidity can be enhanced, the size and thickness of the power transmitting member can be reduced, thus reducing the size and weight of the measuring tool itself.

When the measuring tool has a table for a workpiece to be mounted thereon, the table may preferably be formed by the synthetic resin containing a nanoscale compound.

The table of a measuring tool such as a surface texture measuring machine requires accurate surface finishing, and enough rigidity and low linear expansion coefficient causing no change in the shape (size) for a long time. Since synthetic resin containing nanoscale compound has rigidity not changing for a long time and low linear expansion coefficient, various advantages as a material of the table can be obtained. Since the table made of synthetic resin containing nanoscale compound is lighter than the conventional table made of metal and stone (granite), the weight of the measuring tool itself can be reduced.

Further, since the synthetic resin containing nanoscale compound has excellent pattern transferability, no surface finishing is necessary after injection-molding, thereby simplifying production process and production cost. When further highly accurate finishing is necessary, the finishing process can be greatly shortened as compared to a conventional arrangement.

A second object of the present invention is to provide an encoder capable of improving detection accuracy and reducing size and weight thereof while being produced at a low cost, and a producing method of the encoder.

An encoder according to another aspect of the present invention includes: a stationary member; and a movable member capable of movement relative to the stationary member, the encoder detecting the movement of the movable member relative to the stationary member, in which at least one of the stationary member and the movable member has a body formed by an insulative material including a synthetic resin containing a nanoscale compound and an electro-conductive electrode arranged at a predetermined pitch on the surface of the body.

Electro-conductivity of insulative properties can be applied on the base material of synthetic resin (e.g. polystyrene) by adding nanoscale compound (e.g. carbon nanofiber) and defining various conditions. Though synthetic resin in general is fragile and has great linear expansion coefficient, advantages such as enhancement in rigidity, restrained linear expansion, improvement in anti-frictional properties, decrease in friction coefficient, improvement in thermal conductivity, and application of electro-conductivity or insulative performance can be obtained by adding nanoscale compound. It is not precisely clear why such advantages can be obtained, but it is thought that such advantages are based on a network of the nanoscale compound within the synthetic resin.

Accordingly, at least one of the stationary member and the movable member is formed by insulative synthetic resin containing nanoscale compound as a body. Subsequently, electro-conductive electrode is provided on the surface of the body at a predetermined pitch. Then, insulative portion (body itself) and electro-conductive portion provided on the surface thereof are alternately arranged on the surface thereof. Accordingly, the body itself arranged with the electro-conductive portion on the surface thereof can be used as a scale of an encoder.

The electrode may be made of metal or made of electro-conductive synthetic resin containing nanoscale compound.

Conventionally, a scale on which electro-conductive electrodes are formed on a surface of insulative body such as a glass is bonded on the surface of the stationary member or the movable member. Accordingly, the scale is warped or peeled off and independent bonding step is necessary.

However, according to the above aspect of the present invention, since the stationary member or the movable member can be used as a scale, no separate scale has to be bonded. Accordingly, the production process of an encoder can be simplified and production cost thereof can be lowered. Since the stationary member and the movable member can be used as a scale, no warp or peel-off of the scale is caused. As a result, detection accuracy of the encoder can be improved and can be maintained for a long time. Since the stationary member or the movable member can be used as a scale, the size of the measuring tool using the encoder can be reduced.

Since synthetic resin containing nanoscale compound has low linear expansion coefficient, the linear expansion of the body can be reduced, thus reducing the linear expansion of the scale. Accordingly, an encoder capable of eliminating error caused by linear expansion and accurate measurement accuracy can be provided. When the linear expansion coefficient is low, the encoder can be used for accurate measurement under severe measurement condition without being restricted by measurement temperature.

Since synthetic resin containing nanoscale compound has excellent thermal conductivity, when such encoder is used for a measuring tool of which body is grasped by hand in measurement, the hand heat instantaneously disperses causing no expansion difference. Accordingly, measurement error caused by heat of hand for a hand-tool-type measuring tool which is grasped by hand can be eliminated, thus securing accurate measurement.

Since the rigidity of the synthetic resin containing nanoscale compound is enhanced, the thickness and size of the body can be reduced while securing a predetermined rigidity. As a result, the size and thickness of the measuring tool installing such encoder can be reduced.

In the above encoder, the body may preferably be formed by injection-molding of the synthetic resin containing a nanoscale compound.

Synthetic resin containing nanoscale compound has excellent moldability and pattern transferability. Accordingly, the body of the stationary member or the movable member can be formed with accuracy capable of being used as a scale of an encoder by injection-molding. According to the above arrangement, no machining and surface finishing is necessary after injection-molding. Further, since the production line and production process can be facilitated, the production cost can be lowered.

In the above, the electrode may preferably be formed by the synthetic resin containing a nanoscale compound.

Nanoscale compound can work as an agent for applying electro-conductivity to synthetic resin. Accordingly, the electrode of synthetic resin containing nanoscale compound applied with electro-conductivity is formed on the surface of the body of the stationary member or the movable member. Then, an electrode having advantages of enhancement in rigidity, restrained linear expansion, improvement in anti-frictional properties, reduction in friction coefficient and improvement in thermal conductivity can be formed according to the characteristics of the synthetic resin containing nanoscale compound. Especially, since the anti-frictional properties can be improved and the friction coefficient can be reduced, even when the slide surfaces of the encoder are in direct contact during slide movement, the electrode is not worn out and an encoder allowing smooth slidability can be obtained.

A method according to still another aspect of the present invention is for producing an encoder including a stationary member and a movable member capable of movement relative to the stationary member, the encoder detecting the movement of the movable member relative to the stationary member, the method includes: a body formation step in which at least one of the bodies of the stationary member and the movable member is injection-molded by an insulative material of a synthetic resin containing a nanoscale compound; an electro-conductive layer formation step in which an electro-conductive layer is laminated on the surface of the body; and a peeling step in which the electro-conductive layer is peeled off at a predetermined pitch.

Initially, the body of the stationary member or the movable member is formed as an insulative body by injection-molding of synthetic resin containing nanoscale compound during the body formation step. The electro-conductive layer is formed on the surface of the body during the electro-conductive layer formation step. The electro-conductive layer may be formed by metal plating on the surface of the body or, alternatively, by thinly providing electro-conductive synthetic resin containing nanoscale compound on the surface of the body. During the peeling step, the electro-conductive layer formed during the electro-conductive layer formation step is peeled off at a predetermined pitch to form an electrode pattern.

According to the above arrangement, the electrode can be directly formed on the body of the insulative stationary member or the movable member. In other words, the body of the stationary member or the movable member itself works as the scale of an encoder. Accordingly, there is no need for separately-constructed scale on the body of the stationary member or the movable member as in the conventional arrangement, thus easily forming an encoder in the present invention. As a result, the production line can be simplified and production cost can be reduced. Further, since the body itself can work as a scale, the scale is not warped or peeled off as in a conventional arrangement, thereby improving measurement accuracy.

Since the body itself is easily formed by injection-molding and, since synthetic resin containing nanoscale compound has excellent moldability and pattern transferability, no machining and surface finishing is necessary after injection-molding.

In the above method, an electro-conductive synthetic resin containing a nanoscale compound may preferably be injection-molded on the body to form the electro-conductive layer.

Initially, during the body formation step, the body is formed by injection-molding of insulative synthetic resin containing nanoscale compound. Subsequently, the electro-conductive layer is molded on the body in a superposed manner (double-molding) by electro-conductive synthetic resin containing nanoscale compound. According to the above arrangement, the process can be made extremely simple as compared to an arrangement of metal plating of the body, thus improving production efficiency by simplifying the production process.

Since both of the body and the electro-conductive member are made of synthetic resin containing nanoscale compound, excellent compatibility on the bonding surface can be obtained, so that the electro-conductive layer is not likely to be peeled off and measurement accuracy can be maintained for a long time.

A method according to further aspect of the present invention is for producing an encoder including a stationary member and a movable member capable of movement relative to the stationary member, the encoder detecting the movement of the movable member relative to the stationary member, the method including: a body formation step in which at least one of the bodies of the stationary member and the movable member is injection-molded by an insulative material of a synthetic resin containing a nanoscale compound; a groove formation step in which a groove is formed on the surface of the body at a predetermined pitch; and a groove filling step in which an electro-conductive synthetic resin containing a nanoscale compound is injection-molded on the body to form an electrode on the groove on the surface of the body.

Initially, the body is formed by an insulative synthetic resin containing nanoscale compound by injection-molding during the body formation step. Subsequently, during groove formation step, a groove is formed on the surface of the body at a predetermined pitch on a position corresponding to the position for forming an electrode. During the groove filling step, electro-conductive synthetic resin containing nanoscale compound is filled in the groove formed during the groove formation step by injection-molding. Then, a scale of an encoder can be formed by the synthetic resin as an electrode.

In the above, the groove may be formed by carving the surface of the body during the groove formation step. Since the synthetic resin containing carbon nanoscale compound has approximately the same rigidity as metal, precise machining is possible.

During the groove formation step, the groove may alternatively be formed on the surface of the body by providing a convex portion for forming a groove on the die for injection-molding the body. Since the carbon nanoscale compound has excellent moldability and pattern transferability, the groove can be formed at an accurate pitch by injection-molding. Subsequently, during the groove filling step, the electrode can be easily formed by double molding, so that production efficiency can be improved by simplifying production line.

Since electrode is formed on a groove, a scale having no unevenness of electrode can be formed, so that the scale portion can be used as a slide surface. Since the synthetic resin containing nanoscale compound has improved anti-frictional properties and reduced friction coefficient, there is no abrasion even when the scale is slid and smooth slide movement is possible.

A method according to still further aspect of the present invention is for producing an encoder including a stationary member and a movable member capable of movement relative to the stationary member, the encoder detecting the movement of the movable member relative to the stationary member, the method including: a body formation step in which at least one of the bodies of the stationary member and the movable member is injection-molded by an insulative material of a synthetic resin containing a nanoscale compound; an electrode printing step in which an electrode layer is printed on a base by an electro-conductive ink containing a nanoscale compound; an adhesion layer formation step in which an adhesion layer is formed on the electrode layer; and a base adhesion step in which the base is adhered on the body through the adhesion layer.

An encoder having excellent performance can be obtained according to the above producing method of encoder.

An encoder according to still further aspect of the present invention has: a stationary member; a movable member capable of movement relative to the stationary member while retaining a predetermined gap, the encoder detecting the movement of the movable member relative to the stationary member; a biasing mechanism for biasing the movable member toward the stationary member; and a gap retainer provided on one of opposing sides of the stationary member and the movable member to be in contact with the other of the opposing sides to keep the gap constant, the gap retainer being formed by a synthetic resin containing a nanoscale compound.

According to the above arrangement, a gap retainer for retaining a gap is provided between the stationary member and the movable member and the movable member is biased toward the stationary member by a biasing mechanism. Then, the encoder components provided between the stationary member and the movable member (e.g. the scale on the stationary member and the detector head on the movable member) are slid constantly retaining a predetermined gap, thus maintaining detection accuracy of the encoder.

The gap retainer is for bringing either one of the stationary member and the movable member into contact with the other, which may be a predetermined number of projections provided around the detector head of the movable member, the tip end of the projections being in contact with the stationary member to retain the gap between the stationary member and the movable member. Since the gap retainer is formed by synthetic resin containing nanoscale compound, advantages such as improvement in anti-frictional properties and reduction in friction coefficient can be obtained. Accordingly, since the gap retainer is not likely to be worn out, constant gap can be secured for a long time, so that the measurement accuracy can be kept for a long time. Since the friction coefficient is lowered, the slide movement between the stationary member and the movable member can be made smooth, thus requiring no lubricant.

In the above encoder, the biasing mechanism may preferably be a pressing force transmitting member protruding from the movable member approximately in parallel with the a slide surface, and the movable member and the pressing force transmitting member may preferably be integrally molded by a synthetic resin containing a nanoscale compound.

According to the above arrangement, elasticity can be endowed on the synthetic resin containing nanoscale compound. Accordingly, when, for instance, a thin component is formed by synthetic resin containing nanoscale compound and a force is applied to the thin component in a predetermined direction, the thin component works like a plate spring. By providing the thin component on the movable member and applying pressing force on the thin component, the thin component works as a component for transmitting the pressing force, thereby biasing the movable member.

Conventionally, a separate biasing mechanism is prepared in advance and is attached to the movable member for biasing the movable member toward the stationary member. However, since the pressing force transmitting component can be integrally injection-molded by synthetic resin containing nanoscale compound together with the movable member, the production process (assembly process) can be simplified, thereby improving production efficiency and reducing production cost.

An encoder according to still further aspect of the present invention includes: a stationary member; and a movable member capable of movement relative to the stationary member, the encoder detecting the movement of the movable member relative to the stationary member, in which at least one of the stationary member and the movable member has a body formed by a synthetic resin containing a nanoscale compound and a magnetic material, and a magnetic pole alternately arranged on the surface of the body at a predetermined pitch.

Magnetism can be applied on synthetic resin containing nanoscale compound by adding magnetic material. The sensor pattern of electromagnetic encoder can be formed by magnetizing the surface of the body formed by synthetic resin containing nanoscale compound and magnetic material into N pole and S pole at a predetermined pitch. According to the above arrangement, since the encoder can be constructed only by forming the body by injection-molding and magnetizing a part of the body, production process can be simplified, so that production efficiency can be improved and production cost can be reduced.

An encoder according to still further aspect of the present invention includes: a stationary member; and a movable member capable of movement relative to the stationary member, the encoder detecting the movement of the movable member relative to the stationary member, in which at least one of the stationary member and the movable member has a mirror-finished body formed by a synthetic resin containing a nanoscale compound, and an irreflexive portion arranged at a predetermined pitch on the surface of the body.

The surface of synthetic resin containing carbon nanofiber can be mirror-finished. A scale of photoelectric encoder can be formed by forming a body having mirror-finished surface by synthetic resin containing nanoscale compound and irreflexive portion reflecting no light on the surface of the body at a predetermined pitch. The irreflexive portion may be formed by double-molding irreflexive synthetic resin containing nanoscale compound on the surface of the body after injection-molding the body. Alternatively, the irreflexive portion may be constructed by attaching an irreflexive component on the surface of the body or may be constructed by carving a part of the surface of the body so as not to reflect light. According to the above arrangement, the photoelectric encoder of reflection type can be easily formed, thereby improving production efficiency and reducing production cost.

In the above measuring tool, the encoder and the producing method of the encoder, the nanoscale compound may preferably be any one of carbon nanoscale compounds represented by carbon nanofiber or carbon nanotube.

Carbon nanoscale compound refers to nanoscale compound composed of carbon atom such as carbon nanofiber, carbon nanotube and fullerene. Advantages such as enhancement in rigidity, restrained linear expansion, improvement in anti-frictional properties, reduction in friction coefficient and improvement in thermal conductivity can be obtained by adding such carbon nanoscale compound into synthetic resin base material (e.g. polystyrene). Further, electro-conductivity or insulative properties can be given to the compound by setting appropriate conditions. Accordingly, the performance of the encoder can be improved by forming the body or electrode of the stationary member or the movable member using synthetic resin containing such carbon nanoscale compound. Since the compound is synthetic resin, the product can be molded by injection-molding, thus simplifying production process and reducing production cost.

DETAILED DESCRIPTION OF PREFERRED EMBODIMENT(S)

An embodiment of the present invention will be described below with reference to attached drawings.

First Embodiment

Figure 1:
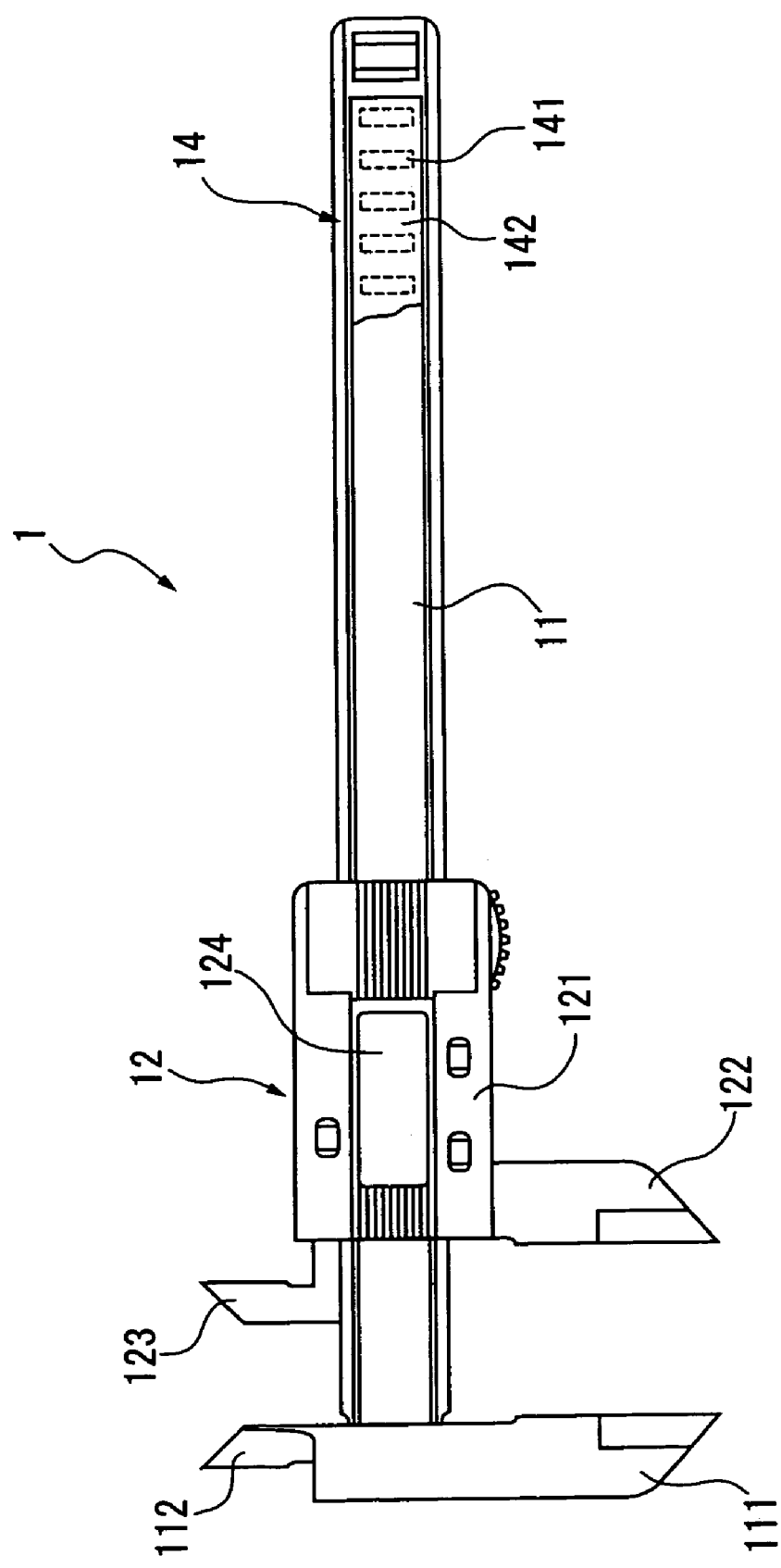
FIG. 1 is an illustration of a digital caliper gauge as a measuring tool according to first embodiment of the present invention.

FIG. 1 shows a digital caliper gauge 1 having an encoder according to a first embodiment of the present invention.

The caliper gauge 1 has a longitudinal main beam 11 as a base, and a slider 12 as a movable component (slide body) slidable along the longitudinal direction of the main beam 11.

The main beam has an outside-measuring jaw 111 and an inside-measuring jaw 112 provided on a longitudinal end of the main beam 11 and a main scale 14 of an electrostatic encoder provided along the longitudinal direction of the main beam 11.

The main beam 11 is molded integrally with the outside-measuring jaw 111 and the inside-measuring jaw 112 by injection molding of synthetic resin by polystyrene containing carbon nanofiber as a nanoscale compound.

Figure 2:
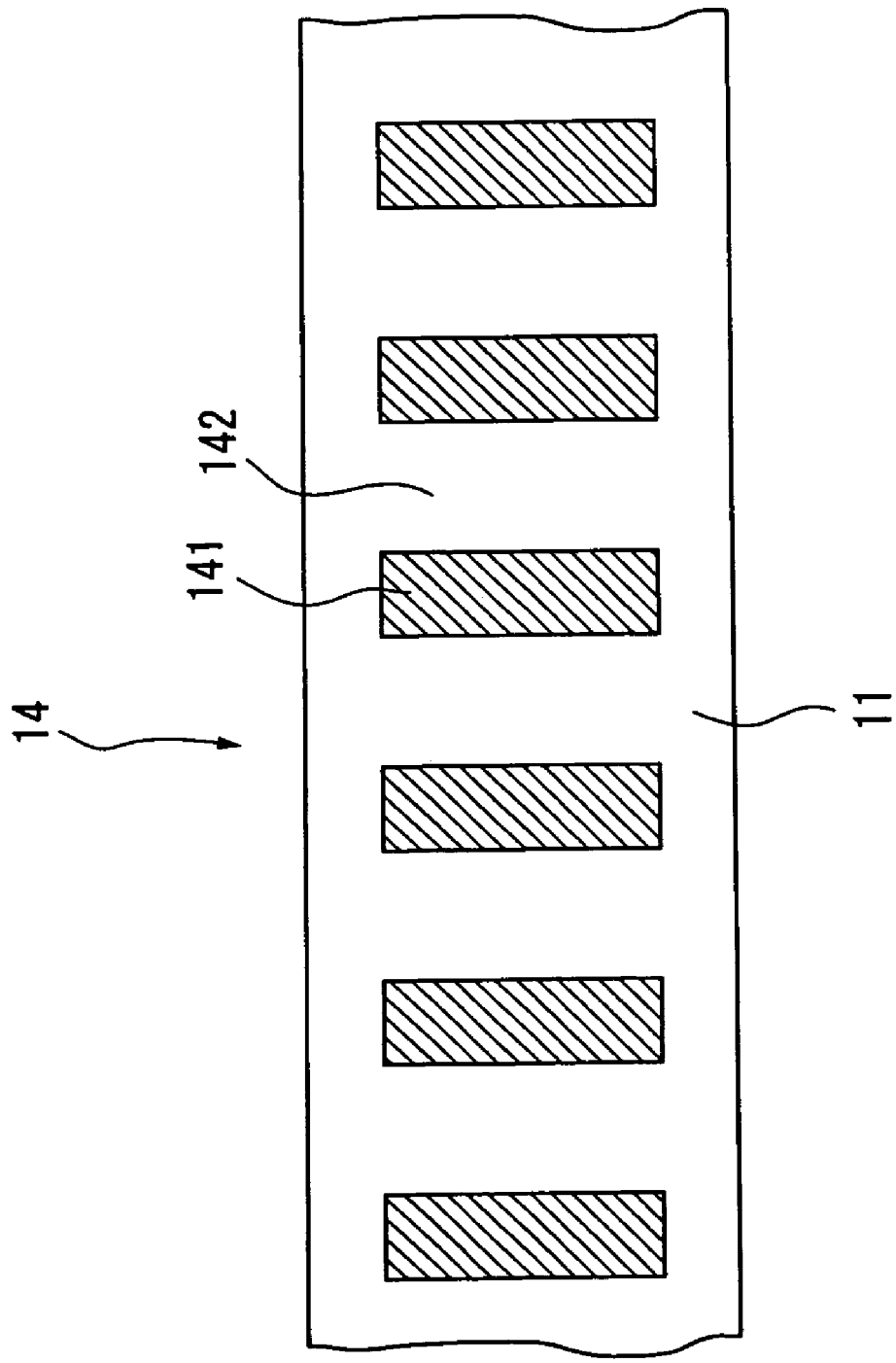
FIG. 2 is an enlarged view of a main scale in the first embodiment.

As shown in enlarged illustration of FIG. 2, the main scale 14 is an electrode pattern consisting of an electro-conductive portion 141 as an electrode formed along the longitudinal direction of the main beam 11 at a predetermined pitch and an insulative portion 142. The main scale 14 is formed by injection molding, which will be specifically described below with reference to FIG. 3.

Figure 13:
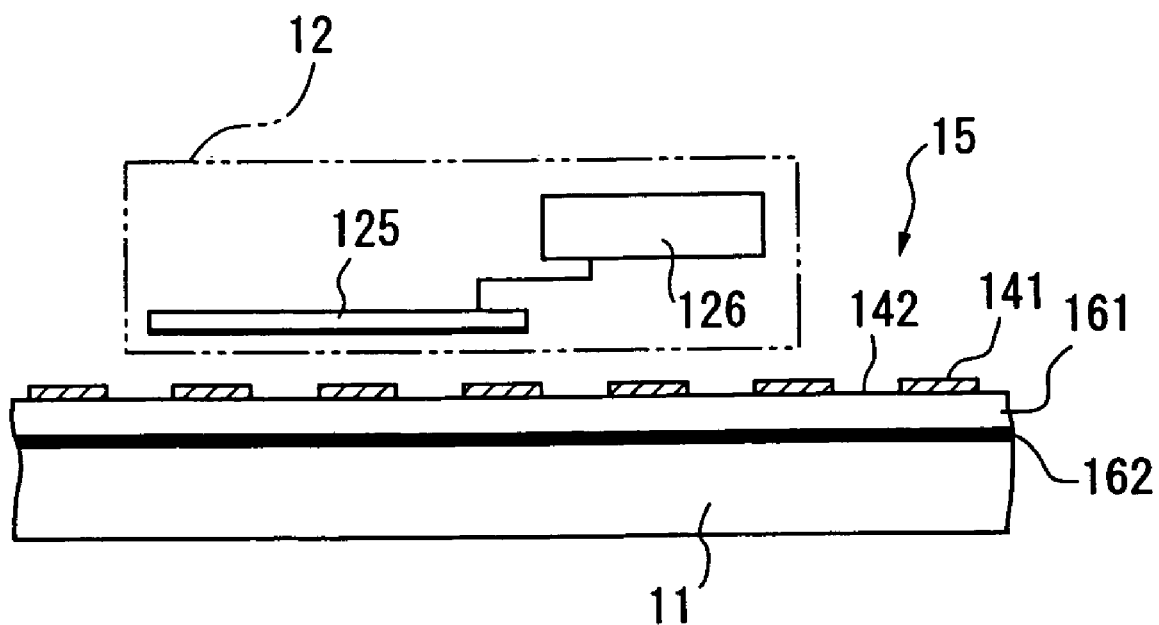
FIG. 13 is an illustration of a conventional encoder.

The slider 12 has a slider body 121, and an outside-measuring jaw 122 and an inside-measuring jaw 123 provided on an end of the slider 12 to be in contact with a target portion of the workpiece in association with the outside-measuring jaw 111 and the inside-measuring jaw 112 of the main beam 11. A detector head 125 to be electrostatically coupled with the electrode pattern on the main scale 14 for detecting movement relative to the main scale 14, an electric circuit 126 for arithmetically calculating the detected value of the detector head 125, and a display 124 for displaying the processed result as a measured value are provided inside the slider body 121. The detector head 125 and the electric circuit 126 are identical with those shown in FIG. 13 illustrating a prior art. The slider 12 is molded integrally with the slider body 121, the outside-measuring jaw 122 and the inside-measuring jaw 123 by injection molding of synthetic resin (polystyrene) containing carbon nanofiber. Electrical conductivity is applied on the synthetic resin containing carbon nanofiber constituting the slider 12.

An electrostatic encoder is constructed by the main scale 14 of the main beam 11 and the detector head 125 of the slider 12.

[Producing Method of Main Scale]

Producing method of the main scale 14 of the main beam 11 will be described below with reference to FIG. 3.

The producing method of the main scale 14 includes a main beam formation step (body formation step) for forming the main beam 11, an electro-conductive layer formation step for laminating the electro-conductive layer 143 on the surface of the main beam 11, and a peeling step for peeling off the electro-conductive layer 143 at a predetermined pitch.

Figure 3A:
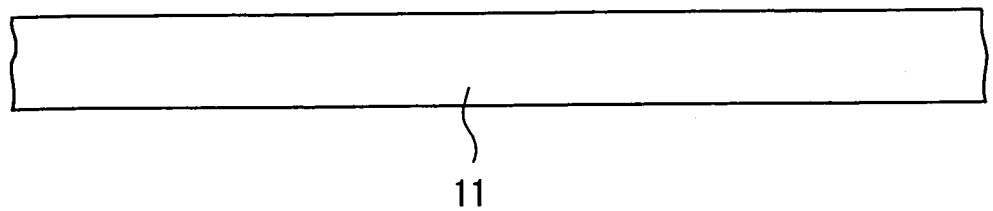
FIGS. 3A–3C are illustrations showing a producing method of an encoder.

During the main beam formation step, the main beam 11 is injection-molded by an insulative synthetic resin containing carbon nanofiber (see FIG. 3(A)). At this time, the main beam 11 is integrally injection-molded including the outside-measuring jaw 111 and the inside-measuring jaw 112. Synthetic resin containing carbon nanofiber has superior moldability and pattern transferability, so that no machining and surface finishing are necessary after injection-molding.

Figure 3B:
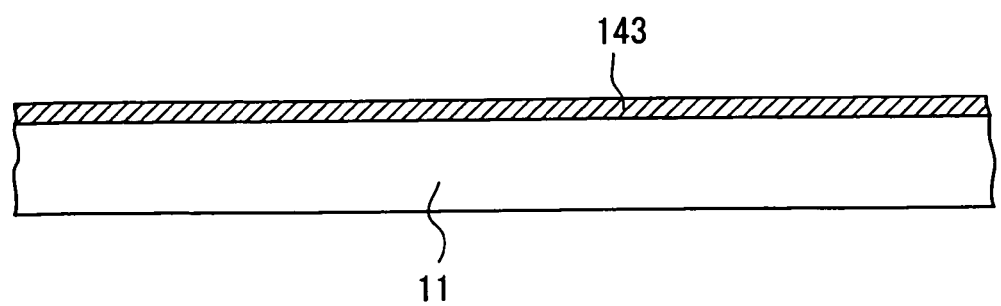
Figure 3C:
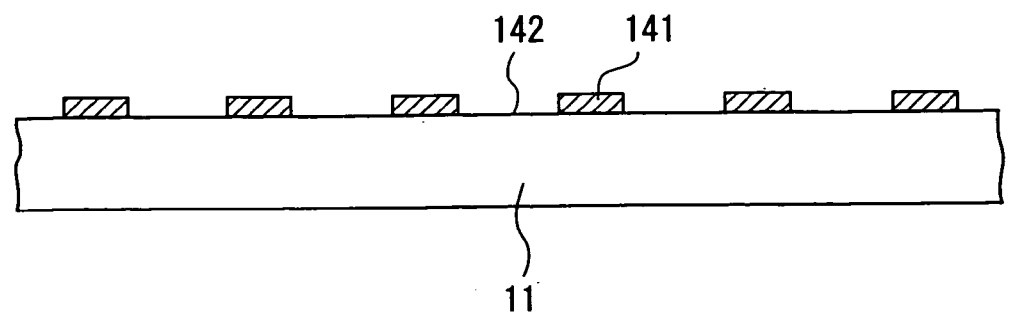

During the electro-conductive layer formation step, electro-conductive synthetic resin containing nanofiber is injection-molded in a film after the main beam formation step (double molding) (see FIG. 3(B)). The electro-conductive layer 143 is formed on the longitudinal portion of the main beam 11 on a surface opposite to the detector head 125 of the slider 12.

During the peeling step, the electro-conductive layer 143 formed during the electro-conductive layer formation step is peeled off at a predetermined pitch along the longitudinal direction of the main beam 11. Then, the insulative portion of the main beam 11 emerges between the electro-conductive portions 141. The main scale 14 of the electrostatic encoder is directly formed on the main beam 11.

[Advantages of First Embodiment]

According to the above arrangement, following advantages can be obtained.

Since the main beam 11 and the slider 12 are formed by the synthetic resin containing carbon nanofiber, advantages such as enhancement in rigidity, restrained linear expansion, improvement in anti-frictional properties, decrease in friction coefficient, improvement in thermal conductivity, and application of electro-conductivity or insulative properties can be obtained.

Since rigidity is enhanced, the measuring jaws (the outside-measuring jaw 111 and inside-measuring jaw 112 of the main beam 11, the outside-measuring jaw 122 and inside-measuring jaw 123 of the slider 12) can be thinly formed while retaining rigidity. Accordingly, narrow target portion can be measured. Further, by enhancing the rigidity of the measuring jaw, no deformation, e.g. curve, does not occur when the measuring jaw is brought into contact with the workpiece, thus improving measurement accuracy.

The deformation of the main beam 11 and the main scale 14 caused by linear expansion can be restrained because of low linear expansion coefficient, thus enabling accurate measurement. Since the linear expansion coefficient is low, accurate measurement is possible without being influenced by high and low ambient temperature during measurement.

Since the anti-frictional properties is improved, wear-out of the slider 12 and the main beam 11 can be prevented after repeated slide movement of the slider 12 on the main beam 11, so that durability can be lengthened and measurement accuracy can be maintained for a long time. Since the slider 12 can be in direct contact with the main scale 14 during slide movement, no mechanism for retaining the gap between the main scale 14 and the slider 12 is necessary.

Since the friction coefficient is low, superior slidability between the main beam 11 and the slider 12 can be obtained without lubricant, so that stain and dust is not likely to be adhered thereon.

Even when the main beam 11 is grasped for measurement, the hand heat is dispersed to the entire mean beam 11 on account of the excellent thermal conductivity, so that difference in expansion according to the position on the main beam 11 (main scale 14) can be prevented, so that accurate measurement is possible without generating measurement error by hand heat.

Since both of the main beam 11 and the slider 12 are formed by synthetic resin, the weight of the caliper gauge 1 can be reduced, so that portability and operability can be enhanced. Since the main beam 11 is made of synthetic resin, the main beam 11 is easily fitted when the main beam 11 is grasped without causing metal allergy.

Since the components can be formed by injection-molding, the caliper gauge 1 can be easily manufactured with low cost. At this time, since the synthetic resin containing carbon nanofiber has superior pattern transferability, no machining or surface finishing is necessary after injection-molding.

Since the slider body 121 has electrical conductivity, the slider body 121 works as an electromagnetic field, so that internal electric circuit is shielded from the external magnetic field and electric field. As a result, the electric circuit inside the slider body 121 is protected, thereby preventing damage and malfunction of the electric circuit.

The main beam 1 forms the insulative portion 142 and the electro-conductive portion 141 is directly formed on the main beam 11. In other words, the main scale 14 is directly formed on the main beam 11. Accordingly, unlike the arrangement where a separate scale is adhered on the main beam 11 by an adhesive, the main scale 14 is not warped or is peeled off from the main beam 11. As a result, the measurement accuracy of the encoder can be improved and the measurement accuracy can be maintained for a long time.

After injection-molding the main beam 11, the electro-conductive layer 143 is formed thereon by injection-molding. Accordingly, the main scale 14 can be easily formed, thereby improving production efficiency and reducing production cost. Since the main beam 11 and the electro-conductive layer 143 are made of the same synthetic resin containing carbon nanofiber, the electro-conductive layer 143 (electrode) is not likely to be peeled off from the body on account of excellent compatibility, thus enhancing durability of the encoder.

Since the main beam 11 and the slider 12 are formed by synthetic resin containing carbon nanofiber, advantages such as enhancement in rigidity, restrained linear expansion, improvement in anti-frictional properties, decrease in friction coefficient and improvement in thermal conductivity can be obtained.

Since the slider 12 is electro-conductive, no static electricity remains between the slider 12 and the main beam 11, thus preventing damage or malfunction of the main scale 14 and the detector head. Further, adhesion of dust etc. can be prevented by preventing electrification, thus maintaining measurement accuracy.

Second Embodiment

Figure 4:
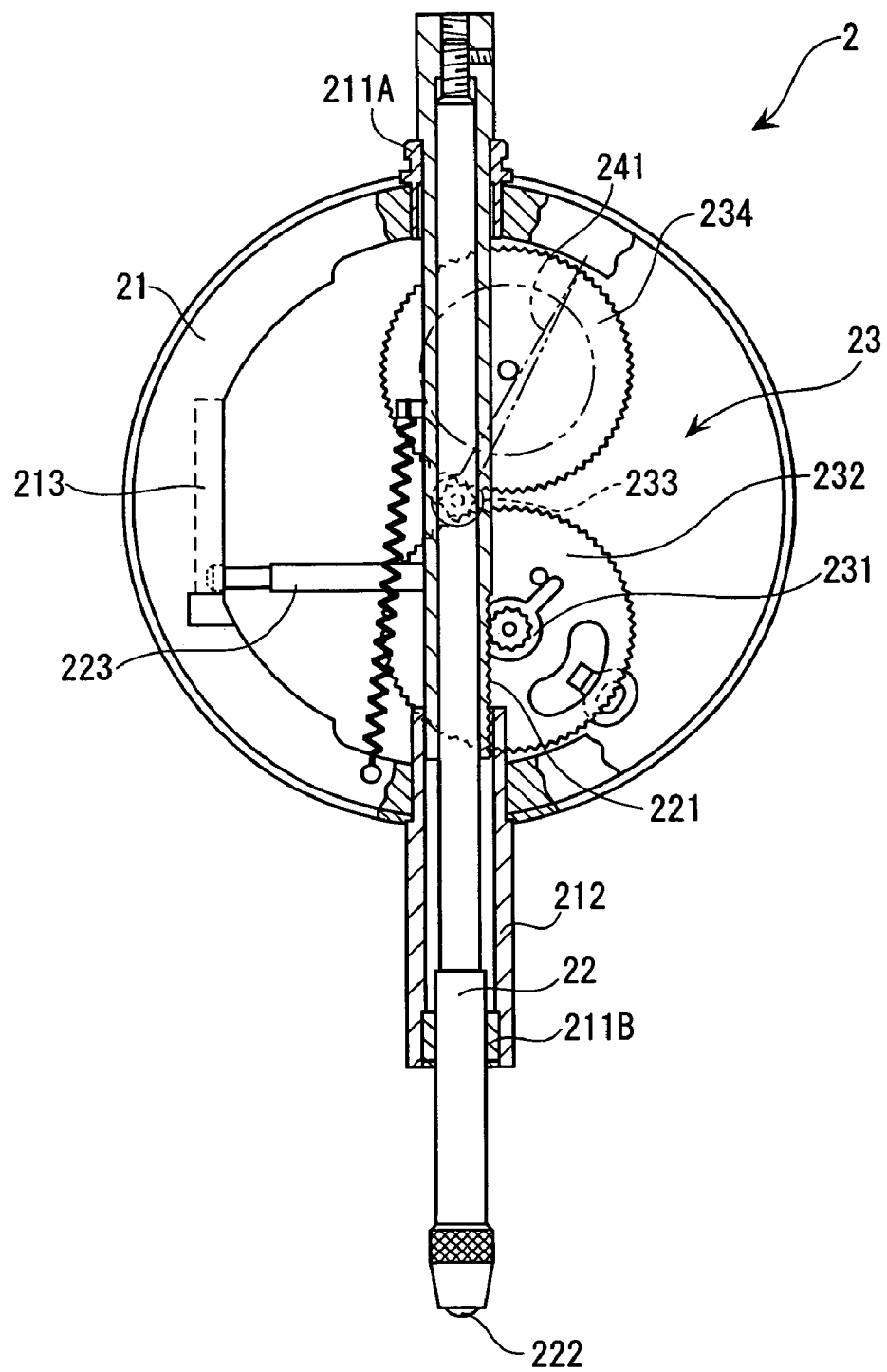
FIG. 4 is an illustration showing a dial gauge according to second embodiment of second embodiment of the present invention.

FIG. 4 shows a dial gauge 2 as a second embodiment of measuring tool according to the present invention. FIG. 4 is an illustration of the dial gauge 2 with back lid thereof being detached. Though a dial gauge is taken as an example in the present embodiment, a micrometer may also be constructed in the same manner.

The dial gauge 2 has a case body 21, a spindle 22 as a slide body penetrating the outer circumference of the case body 21 and being slidably supported in the axial direction thereof, a power transmitting portion 23 for transmitting the displacement of the spindle 22 as a power and a non-illustrated display for displaying the transmitted power as a displacement amount of the spindle 2.

The case body 21 has a bushing 211A as a slide guide for slidably guiding the spindle 22 in the axial direction and a stem 212 protruding downward in FIG. 4. An engaging groove 213 is formed along slide direction of the spindle 22 on the inner circumference thereof. Another bushing 211B as a slide guide of the spindle 22 is provided inside the stem 212. The case body 21, the bushing 211A, the stem 212 and the bushing 211B are formed by injection-molding of a synthetic resin containing carbon nanofiber.

The spindle 22 has a rack 221 provided along the axial direction, and a contact portion 222 provided on the distal end thereof. An engaging pin 223 orthogonal with the axis of the spindle 22 is provided on the intermediate portion of the spindle 22 in the axial direction, the engaging pin 223 engaging with the engaging groove 213 of the case body 21. The spindle 22 is molded integrally with the rack 221 and the contact portion 222 by injection-molding of a synthetic resin containing carbon nanofiber. The engaging pin 223 is injection-molded by a synthetic resin containing carbon nanofiber.

The power transmitting portion 23 is constructed by a gear train as a power transmitting component for transmitting power from the rack 221 of the spindle 22. The gear train includes a pinion 231 meshing with the rack 221 of the spindle 22, a large gear 232 rotating together with the pinion 231, a pointer shaft 233 meshing with the large gear 232 to rotate a pointer 241 of the display, and a backlash-eliminating gear 234 meshing with the pointer shaft 233 to prevent backlash. The respective gears of the gear train are formed by injection-molding of a synthetic resin containing carbon nanofiber.

Figure 5A:
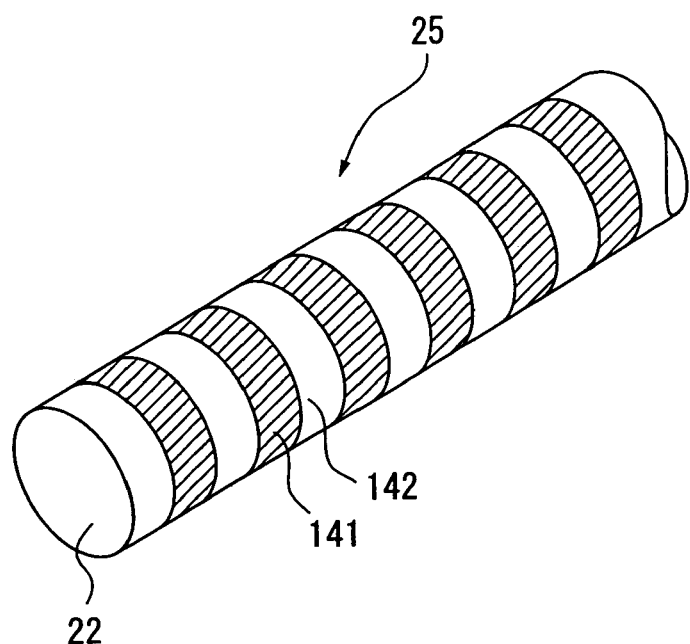
FIGS. 5A–5B are illustrations showing a spindle on which a scale is formed.

As shown in FIG. 5(A), a main scale 25 of an electrostatic encoder is formed along the axial direction of the spindle 22.

In the main scale 25, ring-shaped electro-conductive portions 141 are formed on the circumference of the spindle 22 formed by an insulative synthetic resin containing carbon nanofiber at a predetermined pitch around the axis thereof. The main scale 25 is produced in the same manner as in the first embodiment.

Figure 5B:
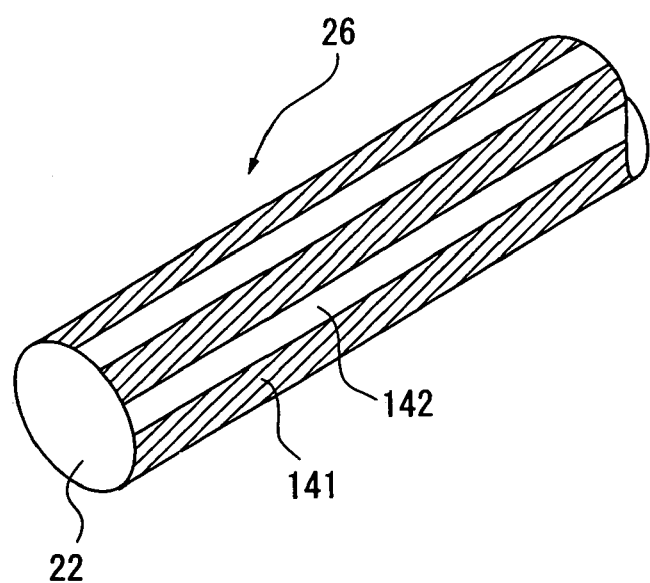

As shown in FIG. 5(B), a main scale 26 of an electrostatic encoder is formed on the circumference of the spindle 22.

In the main scale 26, electro-conductive portion 141 stretching in the axial direction is formed on the circumference of the spindle 22 formed by an insulative synthetic resin containing carbon nanofiber at a predetermined pitch. The main scale 26 is produced in the same manner as in the first embodiment.

Incidentally, though an electrostatic encoder is formed in the present embodiment, a scale of photoelectric encoder or magnetic encoder may be used.

The scale may be formed in spiral around the axis of the spindle.

According to the above dial gauge 2, following advantages can be obtained.

Since the case body 21, the spindle 22 and the power transmitting portion 23 are formed by a synthetic resin containing carbon nanofiber, great rigidity, small linear expansion coefficient, superior slidability and enhanced anti-frictional properties can be obtained. Accordingly, measurement accuracy and durability can be improved. Especially, the slidability and anti-frictional properties between the spindle 22 and the bushings 211A and 211B can be improved.

Since the gears of the power transmitting portion 23 are formed by a synthetic resin containing carbon nanofiber, the size and thickness of the gear (the pinion 231, the large gear 232, the pointer shaft 233 and the backlash-eliminating gear 234) can be reduced while retaining rigidity, thus reducing the size of the dial gauge 2 itself.

The main scales 25 and 26 of the encoder can be directly formed on the spindle 22 of the micrometer or the dial gauge. Accordingly, the encoder can be easily installed in a measuring tool for measuring movement amount of a spindle such as a micrometer and dial gauge to construct a digital measuring tool.

Since the main scales 25 and 26 are formed on the same side, the portion of the main scales 25 and 26 can also be used as a slide portion. Then, since the slide portion independent of the scale portion is not necessary, the length of the spindle can be shortened. Conventionally, since the scale of the spindle cannot be used as the slide portion, the length of the spindle has to be designed to have the length of the scale plus the slide portion. However, since the main scale can be used as the slide portion, the length of the spindle can be shortened, so that the size of the micrometer of the dial gauge can be reduced.

Third Embodiment

Figure 6:
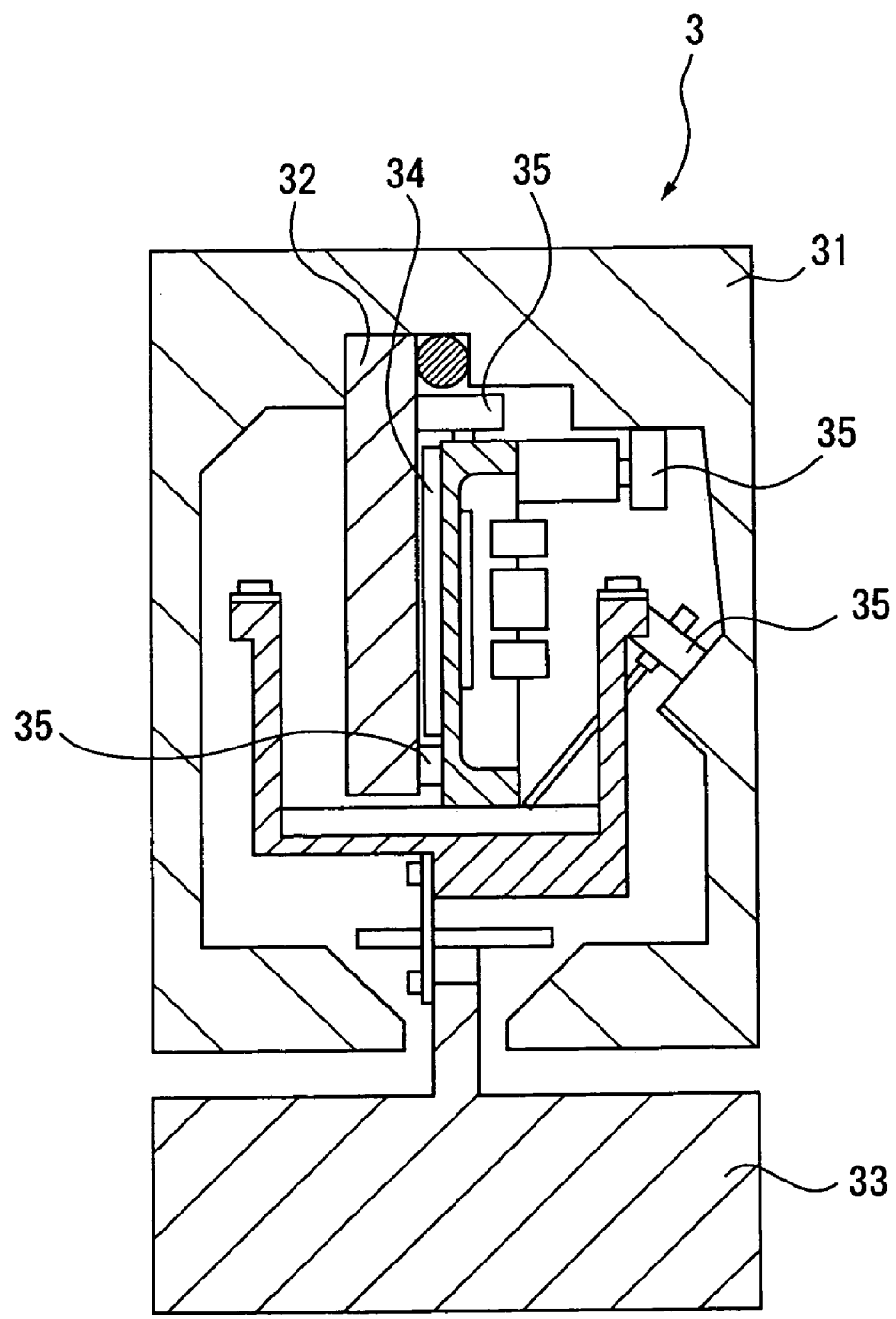
FIG. 6 is a cross section of a linear encoder of a movement measuring tool according to third embodiment of the present invention.

FIG. 6 shows a linear encoder 3 used for movement amount measuring tool according to the present invention. FIG. 6 is a cross section of the linear encoder 3.

Figure 7:
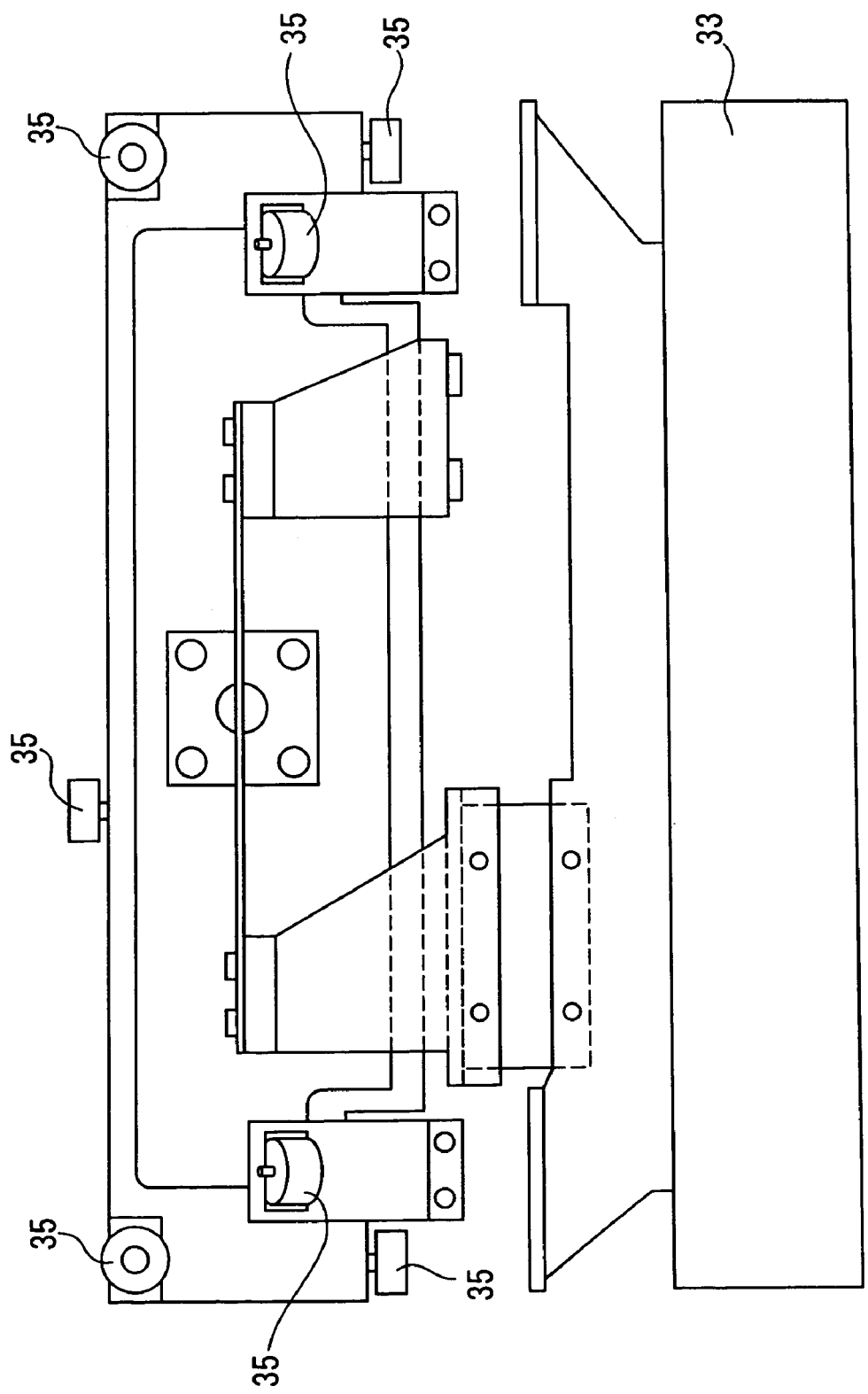
FIG. 7 is an illustration of a slide of the linear encoder.

The linear encoder 3 has a frame 31 as a base, a scale 32 provided on the frame 31, a slide 33 as a slide body capable of slide movement relative to the frame 31, a detector 34 moving together with the slide 33 to detect the movement relative to the scale 32, a roller slider 35 as a slide guide provided on the slide 33 for guiding the slide movement of the slide 33 while being in contact with the frame 31 and the scale 32. In FIG. 6, the slide direction of the slide 33 is perpendicular to the surface of FIG. 6. FIG. 7 shows a side elevational view of the slide 33.

The frame 31, the slide 33 and the slider 35 are formed by injection-molding of the synthetic resin containing carbon nanofiber. The slider 35 is formed by injection-molding of the synthetic resin containing carbon nanofiber and has electro-conductivity.

The slider 35 keeps the gap between the scale 32 and the detector 34 and guides the slide movement of the slide 33.

The arrangement of the encoder of the measuring tool according to the present embodiment is the same as the first embodiment.

According to the above arrangement, following advantages can be obtained.

Since the frame 31 and the slide 33 are formed by synthetic resin containing carbon nanofiber, advantages such as enhancement in rigidity, restrained linear expansion, and improvement in anti-frictional properties can be obtained. Accordingly, measurement accuracy and durability can be improved.

Since the components are formed by injection-molding, production process can be simplified, thus reducing the production cost.

Since the slider 35 is formed by a synthetic resin containing carbon nanofiber, improved slidability and anti-frictional properties can be obtained, thus enduring repeated use.

Since the slider 35 is formed by a synthetic resin having electro-conductivity by adding carbon nanofiber, the slider 35 does not carry static electricity, thus preventing damage and malfunction of the linear encoder 3 and adhesion of dust on the linear encoder 3 caused by static electricity.

Since the frame 31 is formed by synthetic resin containing carbon nanofiber, electro-conductivity can be applied to the frame 31. The frame (case) works as an electromagnetic shield for shielding the internal scale 32 and the detector 34 from the external magnetic field and external electric field. Accordingly, malfunction and damage on the scale 32 and the detector 34 can be prevented, thus keeping measurement accuracy for a long time.

Fourth Embodiment

Figure 8:
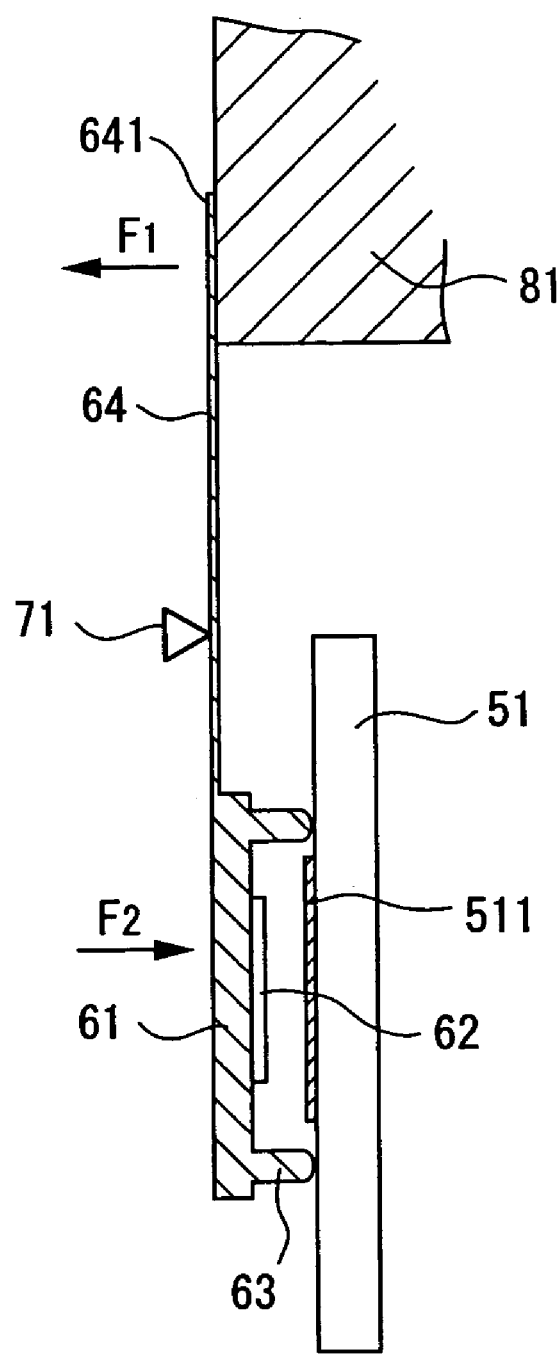
FIG. 8 is an illustration of a pressing force transmitting component and a gap retainer according to fourth embodiment of the present invention.

FIG. 8 shows a fourth embodiment of a measuring tool according to the present invention.

The measuring tool has a stationary member 51, a main scale 511 provided on the stationary member 51, a movable member 61 capable of relative movement along the stationary member 51, and a detector head 62 provided on the movable member 61 electro-statically coupled with the main scale 511 to detect the movement relative to the main scale 51. In FIG. 8, the slide direction of the movable member 61 is perpendicular to the surface of FIG. 8.

A gap retainer 63 protruding from the movable member 61 toward the stationary member 51 to retain the gap between the main scale 511 and the detector head 62 is provided on the movable member 61. The gap retainer 63 is provided on both sides sandwiching the detector head 62.

A pressing force transmitting member 64 as a biasing means formed in thin piece approximately parallel to movement surface of the movable member 61 is provided on the movable member 61. The movable member 61 including the gap retainer 63 and the pressing force transmitting member 64 is integrally formed by a synthetic resin containing carbon nanofiber. An end 641 of the pressing force transmitting member 64 is pressed from a fixed component 81 toward the movable member 61 by a force F1. Since the pressing force transmitting member 64 is supported by a support 71 on the intermediate portion thereof, the movable member 61 is biased toward the stationary member 51 by a force F2.

The arrangement of the encoder of the measuring tool of the present embodiment is the same as that of the first embodiment.

According to the present embodiment, following advantages can be obtained.

Since the gap retainer 63 is formed by synthetic resin containing carbon nanofiber having excellent anti-frictional properties and small frictional coefficient, the abrasion of the gap retainer 63 can be restrained and the gap between the main scale 511 and the detector head 62 can be maintained for a long time.

Since the gap retainer 63 is molded integrally with the movable member 61, assembly process is not necessary as compared to an arrangement of separately providing gap retaining mechanism, thus simplifying the production process. Since the pressing force transmitting member 64 is integrally provided on the movable member 61, the number of components can be reduced as compared to an arrangement of separately providing a biasing means other than the movable member 61. Since the gap retainer 63 and the pressing force transmitting member 64 are molded integrally with the movable member, the production process can be substantially simplified and, since no separate gap retainer and biasing means are necessary, the size of the measuring tool can be reduced.

Modifications

The scope of the measuring tool according to the present invention is not restricted to the above-described embodiments, but includes various modifications as long as an object of the present invention can be achieved.

The present invention may not be applied to caliper gauge or dial gauge but may be applied to various measuring tools such as a micrometer, a coordinate measuring machine, and surface texture measuring machine. Rigidity, linear expansion coefficient, slidability and anti-frictional properties of the measuring tool can be improved and production cost of the measuring tool can be lowered by injection-molding while facilitating production process by applying the present invention.

When the present invention is applied on a coordinate measuring machine or surface texture measuring machine, the table for a workpiece to be mounted may be formed by a synthetic resin containing carbon nanofiber and the gauge block also may be formed by synthetic resin containing carbon nanofiber, so that the durability of the table or the gauge block can be lengthened and deformation thereof can be prevented.

In the second embodiment, the bushing 211A may be integrally formed with the case body 21. Since the synthetic resin containing carbon nanofiber has excellent rigidity, slidability and anti-frictional properties, the case body 21 itself can work as a slide bearing. Accordingly, since no separate bushing 211 is necessary, the production process can be simplified and the production cost can be lowered.

In the third embodiment, the slider 35 may not be a roller but may be a component having convex surface in contact with the frame 31. Since the anti-frictional properties and slidability can be improved by forming the slider 35 with a synthetic resin containing carbon nanofiber, other arrangement other than roller is possible.

Though both the base and the slide body of the slide mechanism such as the main beam 11, the slider 12, the spindle 22 and the bushing 211 are formed by synthetic resin containing carbon nanofiber in the above-described embodiments, only either the base or the slide body may be formed by synthetic resin containing carbon nanofiber. Further, only a part of the power transmitting portion 23 may be formed by synthetic resin containing carbon nanofiber. Since the synthetic resin containing carbon nanofiber is excellent in rigidity, moldability, linear expansion, anti-frictional properties, slidability etc, performance of a measuring tool such as measurement accuracy and durability can be improved even when only a part of the component of the measuring tool is made of synthetic resin containing carbon nanofiber.

Though the electro-conductive layer 143 is formed by injection-molding of electro-conductive synthetic resin containing carbon nanofiber, the electro-conductive layer 143 may be formed by metal plating of the surface of the main beam 11.

Though the gap retainer 63 is provided on the side of the movable member 61, the gap retainer 63 may be provided on the side of the stationary member 51. In other words, the gap retainer 63 may be provided along the slide direction of the movable member 61 sandwiching a scale pattern. In such arrangement, the gap retainer 63 may preferably be molded integrally with the stationary member 51 by a synthetic resin containing carbon nanofiber together.

Though a linearly-slidable encoder is described as an example in the fourth embodiment, the slide surface may be a rotary surface as in a rotary encoder. For instance, synthetic resin containing carbon nanofiber may preferably be used as a gap retainer between a rotor and a stator, where the same advantage as the fourth embodiment can be obtained.

Though the scale of the encoder is formed on the side of the stationary member, the scale of the encoder may preferably be formed on the side of movable member. In other words, the body of the movable member may be formed by synthetic resin containing carbon nanofiber, and a scale pattern may be formed on the surface thereof.

The nanoscale compound may not be carbon nanofiber but may be other nanoscale compound having carbon as a main component such as carbon nanotube and fullerene.

The base material of the synthetic resin may be polystyrene, polycarbonate etc.

Further, the main scale of the first embodiment may be produced according to the following method.

Figure 9A:
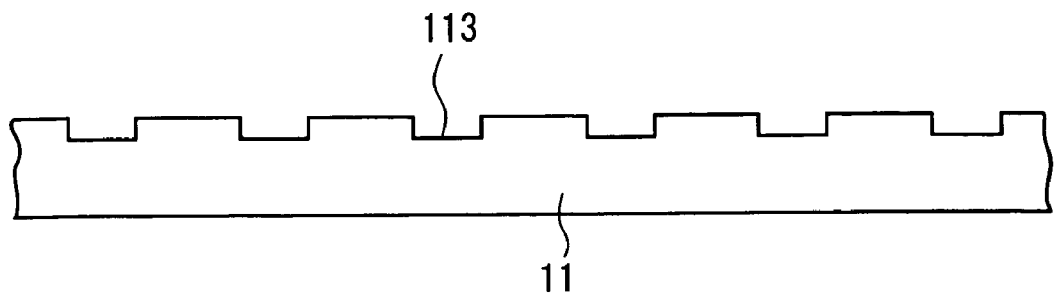
FIGS. 9A–9C are illustrations of an encoder and a producing method of the encoder according to a modification of the present invention.
Figure 9B:
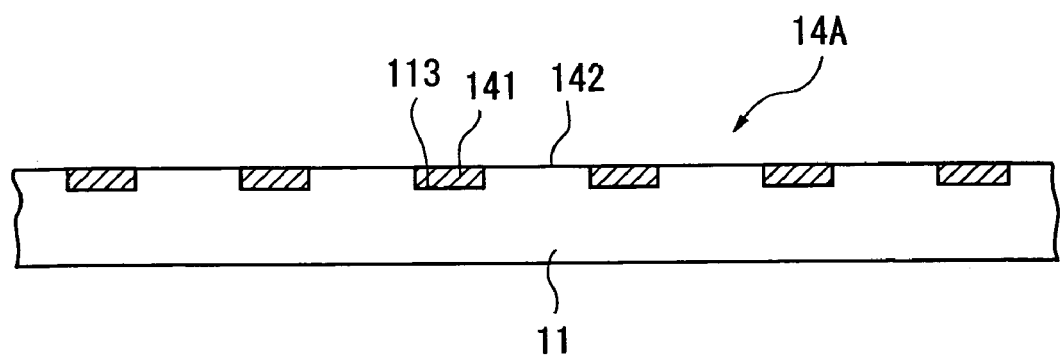
Figure 9C:
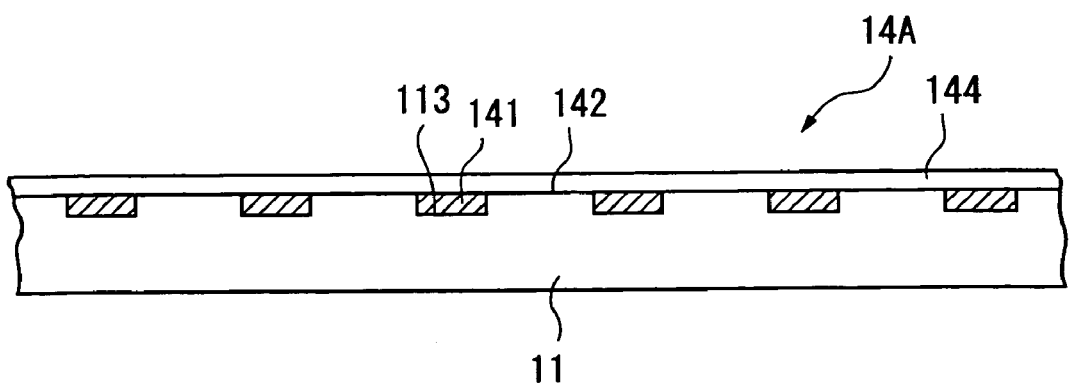

As shown in FIG. 9(C), a main scale 14A is arranged in approximately the same manner as the first embodiment, where the electro-conductive portion 141 formed by electro-conductive synthetic resin containing carbon nanofiber is arranged at a predetermined pitch on the surface of the main beam 11 formed by insulative synthetic resin containing carbon nanofiber. The first modification differs from the first embodiment in that the electro-conductive portion 141 is filled in a groove 113 formed on the main beam 11. Accordingly, there is no convex portion of the electro-conductive portion on the surface of the main beam 11. An insulative film 144 is provided on the surface of the main beam 11.

A production process of the main scale 14A will be described below.

The production process of the main scale 14A includes a main beam formation step (body formation step) for forming the main beam 11, a groove formation step for forming the groove 113 at a predetermined pitch on the surface of the main beam 11, and a groove filling step for filling electro-conductive material in the groove 113.

During the main beam formation step, the main beam 11 is formed by injection molding of an insulative synthetic resin containing carbon nanofiber as in the first embodiment. However, a convex portion is formed on the injection-molding die at a position corresponding to the pitch for forming the electro-conductive portion 141. In other words, the groove formation step for forming the groove 113 on the surface of the main beam 11 at a predetermined pitch is conducted simultaneously with the main beam formation step (see FIG. 9(A)).

During the groove filling step, injection-molding (double-molding) where electro-conductive synthetic resin containing carbon nanofiber is filled in the groove 113 is conducted after the main beam formation step. Then, the electro-conductive portion 141 is formed at a predetermined pitch burying the groove 113 (see FIG. 9(B)). Further, the insulative film 144 is attached on the surface of the main beam 11 (see FIG. 9(C)), thus constructing the electrostatic main scale 14A.

Incidentally, though the groove formation step is conducted simultaneously with injection-molding of the main beam 11, the groove 113 may be carved by machining after injection-molding of the main beam 11. Synthetic resin containing carbon nanofiber has metal rigidity capable of enduring machining.

According to the above first modification, following advantages as well as the advantages of the first embodiment can be obtained.

Since the electro-conductive portion 141 is formed being buried in the groove, the surface of the main scale 14A is made flat. Further, the insulative film 144 is provided on the surface of the main scale 14A. Accordingly, the slider 12 can be directly slid on the main scale 14A interposing the insulative film 144 therebetween.

Since the main beam can be produced only by injection-molding, the production process and production line can be simplified to reduce production cost. Since no step for peeling off the electrode as in the first embodiment is necessary for forming an electrode, the production process can be simplified.

Alternatively, the main scale may be produced according to the process shown in FIG. 10.

Figure 10A:
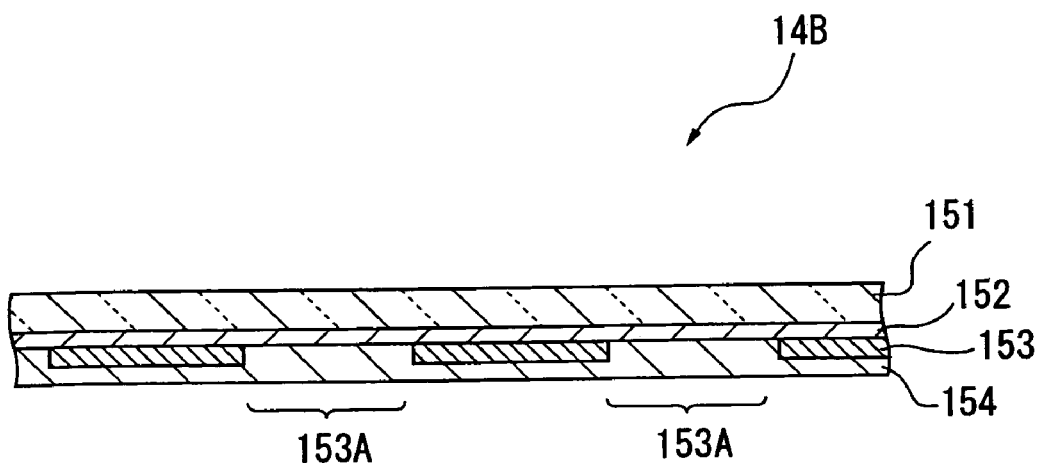
FIGS. 10A–10B are illustrations of an encoder and a producing method of the encoder according to another modification of the present invention.

A main scale 14B shown in FIG. 10(A) has a band-shaped base 151, and a decorative print layer 152, an electrode layer 153 and an adhesive layer 154 provided thereon.

The base 151 is a thin flexible polyester transparent film cut in a predetermined shape and is insulative.

The decorative print layer 152 is a layer of ink directly printed on the surface of the base 151, where characters and stripe pattern can be printed. The printed character and pattern can be observed through the transparent base 151.

The electrode layer 153 is formed by printing an electro-conductive ink including synthetic resin containing carbon nanofiber on the decorative print layer 152. A multiple of the same electrodes shown in FIG. 2 can be formed along the longitudinal direction by the electrode layer 153.

The bonding layer 154 is a layer of adhesive such as two-sided tape attached on the electrode layer 153. The bonding layer 154 enters into between the respective electrodes, and reaches the surface of the decorative print surface 152 at the portion 153A having no electrode on the electrode layer 153.

Figure 10B:
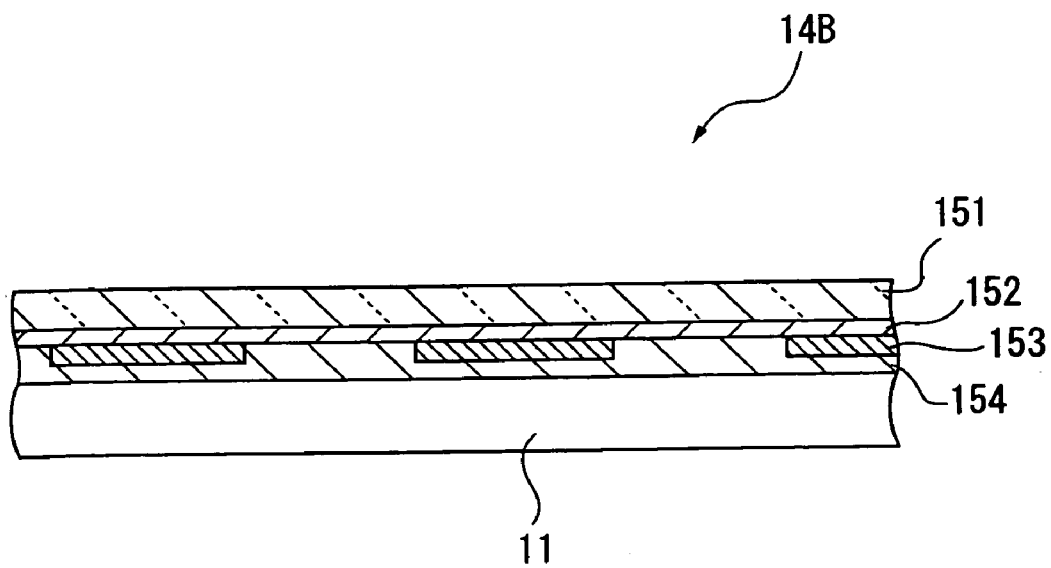

As shown in FIG. 10(B), the main scale 14B is adhered on the main beam 11 made of insulative synthetic resin containing carbon nanofiber through the bonding layer 154.

According to the above method, the main scale 14B can be easily produced by printing.

Though electrostatic encoder is used as an example in the above embodiments, other encoders may preferably be used.

Figure 11:
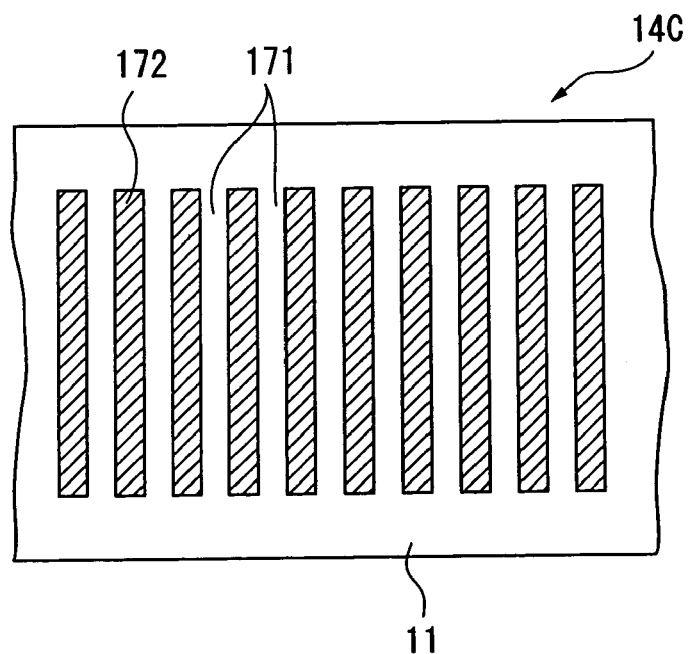
FIG. 11 is an illustration showing a main scale of a photoelectric encoder according to still another modification of the present invention.

FIG. 11 shows a main scale using a photoelectric encoder.

A main scale 14C using a photoelectric encoder has an optical matrix including a reflective section 171 and an irreflexive section 172.

The main scale 14C has a main beam (body) 11 formed by synthetic resin containing carbon nanofiber having mirror surface, on which the irreflexive portion 172 is formed at a predetermined pitch. The irreflexive portion 172 does not reflect light by coarsely carving the surface of the main beam 11.

The detector head of the slider 12 has a light source for irradiating light on the main scale 14C and a light receiver for receiving the light reflected by the main scale 14C.

Incidentally, though light reflection is prevented by carving the surface of the irreflexive portion 172, a member reflecting no light may be adhered or a paint reflecting no light may be coated thereon.

Alternatively, after injection-molding the main beam with surface roughness not to reflect light, the reflective portion 171 may be formed on the surface of the main beam 11.

According to the above arrangement, the same advantages as in the first embodiment can be obtained and a photoelectric encoder can be easily formed, thus enhancing production efficiency and reducing production cost.

Figure 12:
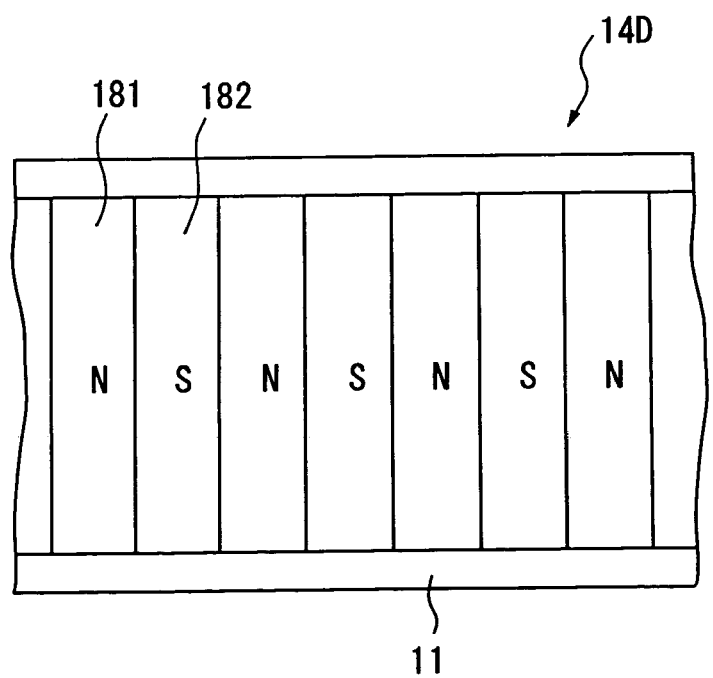
FIG. 12 is an illustration showing a main scale of magnetic encoder according to further modification of the present invention.

FIG. 12 shows an example using a magnetic encoder as a main scale.

The main scale 14D using the magnetic encoder has an alternate arrangement of an N pole 181 and an S pole by a predetermined pitch.

The main scale 14D has the main beam (body) 11 which is made by injection-molding of synthetic resin containing carbon nanofiber and magnetic material. The magnetic poles may be formed after molding the main beam 11 by magnetizing a part of the main beam 11 by bringing electromagnet or a magnet close to the main beam 11 in the same manner for magnetizing magnet storage media, etc.

The detector head of the slider 12 may have a coil for changing induced electric current by magnetism of the main scale 14D.

According to the above arrangement, since the main scale can be constructed by magnetizing the main beam formed by injection-molding, production efficiency can be enhanced and production cost can be lowered as well as obtaining the same advantages as in the first embodiment.

What is claimed is:

1. A method for producing an encoder including a stationary member and a movable member capable of movement relative to the stationary member, the encoder detecting the movement of the movable member relative to the stationary member, the method comprising:

a body formation step in which at least one of the bodies of the stationary member and the movable member is injection-molded by an insulative material of a synthetic resin containing a nanoscale compound;

an electro-conductive layer formation step in which an electro-conductive layer is laminated on the surface of the body; and a peeling step in which the electro-conductive layer is peeled off at a predetermined pitch to form an electrode pattern including the predetermined pitch; and an arranging step in which the movable member and the stationary member are arranged with the movable member movable relative to the stationary member to form an encoder that detects movement of the movable member relative to the stationary member, wherein the nanoscale compound is any one of carbon nanoscale compounds represented by carbon nanofiber or carbon nanotube.

2. The method for producing an encoder according to claim 1, wherein an electro-conductive synthetic resin containing a nanoscale compound is injection-molded on the body to form the electro-conductive layer.

3. A method for producing an encoder including a stationary member and a movable member capable of movement relative to the stationary member, the encoder detecting the movement of the movable member relative to the stationary member, the method comprising:

a body formation step in which at least one of the bodies of the stationary member and the movable member is injection-molded by an insulative material of a synthetic resin containing a nanoscale compound;

a groove formation step in which a groove is formed on the surface of the body at a predetermined pitch; and a groove filling step in which an electro-conductive synthetic resin containing a nanoscale compound is injection-molded on the body to form an electrode on the groove on the surface of the body to form an electrode pattern including the predetermined pitch; and an arranging step in which the movable member and the stationary member are arranged with the movable member movable relative to the stationary member to form an encoder that detects movement of the movable member relative to the stationary member, wherein the nanoscale compound is any one of carbon nanoscale compounds represented by carbon nanofiber or carbon nanotube.

\* \* \* \* \*